No. 879,707.

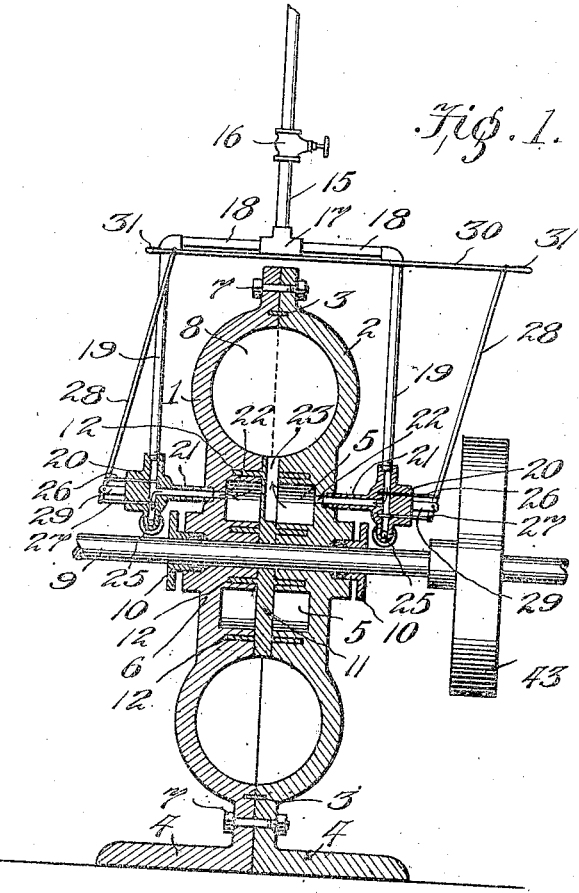

PATENTED FEB. 18, 1908.

J. WEATHERFOR.
ROTARY ENGINE.
APPLICATION FILED JUNE 11, 1907.

2 SHEETS—SHEET 2.

Witnesses
Frank B. Hoffman

Inventor
Jesse Weatherford
By Victor J. Evans
Attorney

UNITED STATES PATENT OFFICE.

JESSE WEATHERFORD, OF HORACE, ILLINOIS.

ROTARY ENGINE.

No. 879,707.　　　Specification of Letters Patent.　　　Patented Feb. 18, 1908.

Application filed June 11, 1907. Serial No. 378,459.

*To all whom it may concern:*

Be it known that I, JESSE WEATHERFORD, a citizen of the United States of America, residing at Horace, in the county of Edgar and State of Illinois, have invented new and useful Improvements in Rotary Engines, of which the following is a specification.

This invention relates to rotary engines, and one of the principal objects of the same is to provide a rotary engine of simple construction, which will operate smoothly without jarring, which can be readily reversed, and in which the valves usually employed may be dispensed with.

Another object of the invention is to provide a rotary engine with sliding abutments comprising pivoted disks, and means for sliding said disks in a position for forming steam abutments alternately.

Figure 3:
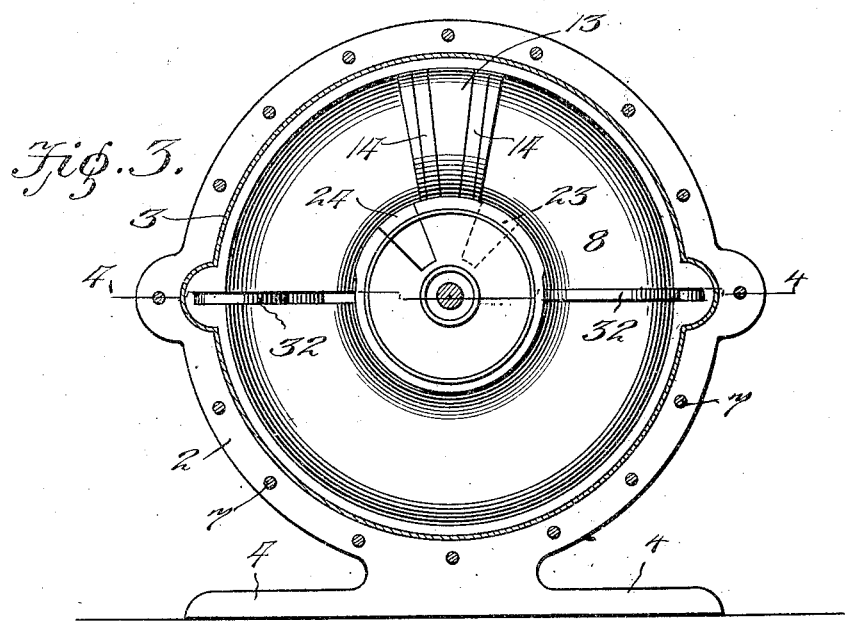
Figure 4:
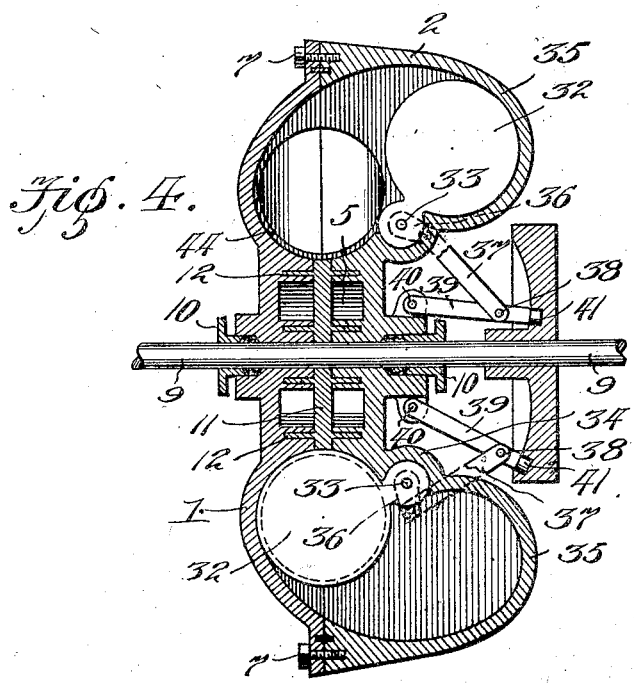

These and other objects may be attained by means of the construction illustrated in the accompanying drawings, in which:

Figure 1 is a central vertical section through a rotary engine made in accordance with my invention. Fig. 2 is a plan view of the cam for moving the sliding abutments. Fig. 3 is a side elevation of one member of the cylinder, and showing the piston and the sliding abutments, and the packing strip and bolts in section. Fig. 4 is a horizontal section on the line 4—4 of Fig. 3.

Referring to the drawing for a more particular description of my invention, the numeral 1 designates one section of the cylinder, and 2 is the other section thereof, said sections being each provided with a groove in which is fitted a packing strip 3, and said sections each having a base portion 4 designed to rest upon and be properly secured to a floor. The sections 1 and 2 are each provided with a steam chest 5 which surrounds the central hub portion 6 of said sections when said sections are secured by means of the bolts 7. An annular piston cylinder or chamber 8 of circular form in cross section is formed between the sections 1 and 2. A shaft 9 extends through the hub portion 6 of the cylinder and stuffing boxes 10 are provided to insure a steam tight bearing for said shaft. Keyed to the shaft 9 is a piston carrier 11 provided with oppositely disposed flanges 12 fitted in grooves in the sections 1 and 2, and said piston carrier having formed thereon or connected thereto a piston 13 provided with packing disks 14, said piston adapted to fit the piston chamber 8 and to form a steam tight connection with the circular inner wall thereof. A steam inlet pipe 15 provided with a suitable valve 16 is connected by means of a T-coupling 17, with branch pipes 18 and leading from said branch pipes are pipes 19 fitted into valve casings 20, said valve casings each provided with a nipple 21 fitted into the sections 1 and 2 and communicating through openings 22 with the steam chests 5. A piston carrier 11 is provided with an inlet passage 23 upon one side thereof, and an exhaust passage 24 upon the opposite side thereof, said inlet and exhaust passages communicating with the steam chamber 8. Exhaust pipes 25 are connected to the valve casings 20. Sliding valves 26 and 27 are disposed within the valve casings 20 upon the upper and lower sides of the nipples 21, and the stems of said valves are connected to levers 28 pivoted to a bracket 29 projecting outward from the valve casings. The upper ends of the levers 28 are pivotally connected by a handle bar 30 having hand holds 31 at opposite ends thereof. By means of this handle bar the levers 28 may be moved to reverse the engine by moving one of the valves 26 outward to admit steam to the steam chest 5 and close the other valve 26 to open the valve 27 upon that side of the engine to permit the exhaust to pass through the pipe 25 at that side. When the handle bar is shifted to the opposite side, the valves are reversed to permit the steam to pass through the opening 24 into the chamber 8, as will be obvious.

Sliding abutments 32 comprising disks pivotally mounted upon shafts 33 journaled in enlargements 34 formed in the section 2 of the cylinder are alternately operated to close the chamber 8, said disks being mounted in housings 35 projecting outward from the section 2 and forming supports for opposite sides of said disks 32, said housings having smooth interior walls upon which said disks freely slide. Connected to the shafts 33 are short cranks 36, and connected to said cranks are links 37, the opposite ends of said links being pivotally connected at 38 to cam levers 39 pivoted at 40 to lugs formed upon the hub portion of the section 2. The outer end of said cam levers 39 are provided with rollers 41 fitted in a cam groove 42 in a cam wheel 43 mounted upon the shaft 9, and the outer surface of said cam wheel serving as a belt pulley.

The operation of my rotary engine may be briefly described as follows: With the valves 26 and 27 disposed in the positions shown in Fig. 1, steam entering the nipple 21 will pass into the steam chest 5 and through the opening 23 into the steam passage 8 at one side of the piston 14. One of the abutments 32 is at this time in position across the chamber 8 with the periphery of said abutment resting upon the projecting flange 44 to form a brace and tight joint. The piston is thus rotated toward the left in Fig. 3, and after it passes the abutment at the left of said figure, said abutment closes communication while the opposite one is opened by the action of the cam 43, the exhaust passing through the opening 24 and out through the nipple 21 and pipe 25 at the left of Fig. 1.

From the foregoing it will be ovious that a rotary engine made in accordance with my invention is of comparatively simple construction, will work smoothly, can be readily reversed, has practically no dead center, occupies but little space and can be constructed at slight cost.

Having thus described the invention, what I claim is:

1. In a rotary engine, the combination of a cylinder comprising two sections, steam chests formed in said cylinder, a circular steam chamber, a piston carrier, a circular piston moving in said chamber and connected to said carrier, said carrier provided with oppositely disposed steam passages establishing communication between the steam chests and the steam chamber, sliding abutments comprising pivoted disks, levers connected to said disks, and cams for alternately moving said abutments into and out of line with said steam chamber.

2. In a rotary engine, the combination of a cylinder, a shaft mounted in said cylinder, a piston carrier mounted on said shaft, a piston carried by said piston carrier, steam chests, steam inlet pipes communicating with the steam chests at opposite sides of said carrier, steam passages formed in said carrier upon opposite sides, sliding abutments comprising pivoted disks, levers connected to said disks, cams for actuating said levers and disks, a valve casing connected to each of said steam inlet pipes, levers, and a handle bar for shifting said valves to reverse the engine.

In testimony whereof, I affix my signature in presence of two witnesses.

JESSE WEATHERFORD.

Witnesses:
J. WM. SNYDER,
JAMES D. BARR.